United States Patent [19]

Castelaz

[11] Patent Number: 5,293,455
[45] Date of Patent: Mar. 8, 1994

[54] SPATIAL-TEMPORAL-STRUCTURE PROCESSOR FOR MULTI-SENSOR, MULTI SCAN DATA FUSION

[75] Inventor: Patrick F. Castelaz, Yorba Linda, Calif.

[73] Assignee: Hughes Aircraft Company, Los Angeles, Calif.

[21] Appl. No.: 660,362

[22] Filed: Feb. 13, 1991

[51] Int. Cl.$^5$ ............................................... G06F 15/18
[52] U.S. Cl. ......................................................... 395/24
[58] Field of Search ................................. 395/1, 23, 24

[56] References Cited

U.S. PATENT DOCUMENTS

| | | | |
|---|---|---|---|
| 4,660,166 | 4/1987 | Hopfield. | |
| 4,858,147 | 8/1989 | Conwell. | |
| 4,874,963 | 10/1989 | Alspector | 395/24 |
| 4,945,494 | 7/1990 | Penz et al. | |

OTHER PUBLICATIONS

Ackley et al, "Alearning Algorithm for Boltzmann Machines," Cognitive Science 9:147-169, 1985.
Patent Application for: Adaptive Processor For Multi--Source Data Fusion. By: Patrick F. Castelaz, PD-88371, Ser. No.: 392,683.
Article on: An Introduction To Computing With Neural Nets. By: Richard P. Koppmann, IEEE ASSP Magazine, Apr. 1987.
Article on: Optimization By Simulated Annealing. By: S. Kirkpatrick, C. D. Gelatt, Jr., M. P. Vecchi, V. 229, No. 4598, May, 1983.
Patent Application for: Neural Engine By: Patrick F. Castelaz et al., PD-89333. (Attorney Docket No.), Ser. No.: 534,211.
Patent Application for: Analog Associative Processor For Angle-Only Target By: Patrick F. Castelaz, PD-86197 (Attorney Docket No.) Ser. No.: 255,205.
Patent Application for: Clusterin And Association Processor By: Patrick F. Castelaz, PD-88374, Ser. No.: 340,343.
Patent Application for: Cellular Network Assignment Processor Using Randomly By: Patrick F. Castelaz Triggered Adaptive Cell Thresholds. Attorney Docket No.: PD87118, Ser. No.: 255,190.
Patent Application for: Celluar Network Assignment Processor Using Minimum/Maximum Convergence Technique. By: Patrick F. Castelaz Attorney Docket No.: 87116, Ser. No. 255,692.
Patent Application for: Fine Grained Microstructure Processor. By: Patrick F. Castelaz, Attorney Docket No.: 88376, Ser. No.: 325,264.

Primary Examiner—Allen R. MacDonald
Attorney, Agent, or Firm—W. K. Denson-Low

[57] ABSTRACT

A system is provided for associating a set of data values where each data value belongs to one of a plurality of classes and also to one of a plurality of types. The system includes an array of memory cells arranged in rows and columns, each memory cell storing one data value. An energy computation cell for each column is coupled for computing an energy value proportional to the likelihood that the data values in each column comprise one of the desired associations. A system control module to the energy computation cells for transferring the data values of a given class and type from one memory cell to another memory cell of the same class and type, within a given row of memory cells when the replacement lowers to the energy value for the column. The energy values computed by all the energy computation cells are summed to determine a total energy value. Each time data values are transferred, the total energy value of all of the energy cells is computed. The lowest total energy value after successive replacements represents a state in which each column contains the desired association of data values.

26 Claims, 8 Drawing Sheets

SPATIAL-TEMPORAL-STRUCTURE PROCESSOR FOR MULTI-SENSOR, MULTI SCAN DATA FUSION

BACKGROUND OF THE INVENTION

1. Technical Field

This invention relates to information processors, and more particularly to a high speed parallel processor for associating large numbers of high dimensionality data elements.

2. Discussion

High dimensionality data association for large numbers of data elements is one of today's most formidable computing problems These problems typically involve both assignment and correlation tasks. In assignment, a number of data elements are to be selected from among many others and assigned to other elements in such a way as to force the entire assignment over all elements to be optimal in some sense. In correlation problems, elements in one set of data are correlated with elements in another set of data.

These association problems are generally difficult to solve because they are not generally solvable with a single solution but, instead, there may be a range of solutions over which the best solution is sought. Moreover, association problems frequently involve a combinatorial "explosion", or exponential blow up, in the number of possible answers. Association problems are present in a number of applications including, among others, resource allegation, object association, position-only track initiation, deghosting for angle-only targets detected by multiple sensors, pattern matching of two-dimensional feature vectors, template matching, two-dimensional filtering, computerized tomography, manufacturing inspection vision systems and medical image diagnostic systems.

Previous approaches in this area have emphasized solutions in software on both general purpose and special purpose (vector, array, systolic, etc.) computers. The disadvantage of the software approach is that it requires explicit algorithm and software development and massive computational power. In addition, software solutions are not feasible for application to real-time or near real-time problems with large numbers of data elements. For example, a nine dimensional data association problem would require $N^9$ operations, where N is number of nine dimensional data elements. For problems where N is larger than a few dozen, and where real time operation is required, software solutions simply are not feasible.

Another approach involves the use of connectionist and neural network architectures. Connectionists architecture generally refers to systems which involve massively connected, fine grained processing elements. Neural networks are similar to connectionist architectures, so named because of their similarity to biological networks in their highly interconnected structure and in their ability to adapt to data and exhibit self learning. These approaches have the advantage of operating without requiring the development of an explicit algorithm. For example, see U.S. Pat. No. 4,660,166, issued to J. Hopfield, where a type of neural network is used to solve association problems, such as the traveling salesman problem. Another technique used in connectionist and neural network systems is known as simulated annealing. See S. Kirkpatrick, Gelatt, and Vecchi: "Optimization by Simulated Annealing", 220 SCIENCE, page 671-680 (1983).

Unfortunately, while software simulations of these approaches have been developed, practical hardware versions have not yet been developed which fully realize the potential of these parallel processing approaches. In addition, neural networks such as the one described in U.S. Pat. No. 4,660,166 are generally not fast enough for real-time applications of high dimensionality data association for large numbers of data elements. For example, this system is not able to solve the traveling salesman problem for significantly more than thirty cities.

Thus, it would be desirable to provide an information processor which can solve high dimensionality data association problems for large number of data elements in real-time. It would be desirable to provide an information process that can solve high dimensionality data association problems for a large number data elements which does not require an explicit extensible algorithm development.

Also, it would be desirable to provide such an information processor which can be implemented in current hardware technology and at a reasonable cost.

SUMMARY OF THE INVENTION

In accordance with the teachings of the present invention, a system is provided for associating a set of data values where each data value belongs to one of a plurality of classes and also to one of a plurality of types. The system includes an array of memory cells arranged in rows and columns, each memory cell storing one data value, and the data values being arranged in the memory cells so that each column contains one data value of each possible combination of the classes and types. The system includes a data bus for connecting the memory cells, and an energy computation cell for each column coupled to the databus for computing an energy value for each column. The energy value is proportional to the likelihood that the data values in the column comprise one of the desired associations.

In addition, a system control module is connected to the databus and to the energy computation cells for replacing the data values of a given class and type from one memory cell to another memory cell of the same class and type within a given row of memory cells when said replacement lowers the energy value for the column. The system control module also sums all the energy values computed by all of the energy computation cells to determine a total energy value proportional to the likelihood that all columns contain desired associations of data values. In addition, each time the system control module replaces data values, the system control module also determines the total energy value of all of the energy computation cells. The lowest total energy value after successive replacements represents a state in which each column contains the desired association of data values.

In accordance with another embodiment of the present invention a method for forming desired associations among a set of data values is provided, where each data value belongs to one of a plurality of classes and one of a plurality of types. The method initially comprises the step of providing an array of memory cells arranged in row and columns, each memory cell storing one of the data values, wherein the data values are arranged in the memory cells so that each column contains one data value of each possible combination of the classes and types. Next, data values are transmitted along a data bus into the memory cells, and an energy value is computed for each column of memory cells wherein the energy value is proportional to the likelihood that the data values in the column together comprise one of the desired associations. Next, data values are replaced from a memory cell of the given class and type to another memory cell of the same class and type within a given row of the memory cells. Then, the energy for the column of the replaced cell is determined to see if it has increased due to the replacement and the data values are put back in their original positions when the energy value is increased due to the replacement. Next, all the energy values for each column are summed to determine a total energy value proportional to the likelihood that all columns contain desired associations of data values. Finally, the step of replacing the data values is repeated until a lowest total value is reached based on a predetermined criteria.

DESCRIPTION OF THE DRAWINGS

The various advantages of the present invention will become apparent to those skilled in the art after reading the following specification and by reference to the drawings in which.

DESCRIPTION OF THE PREFERRED EMBODIMENTS

Figure 1:
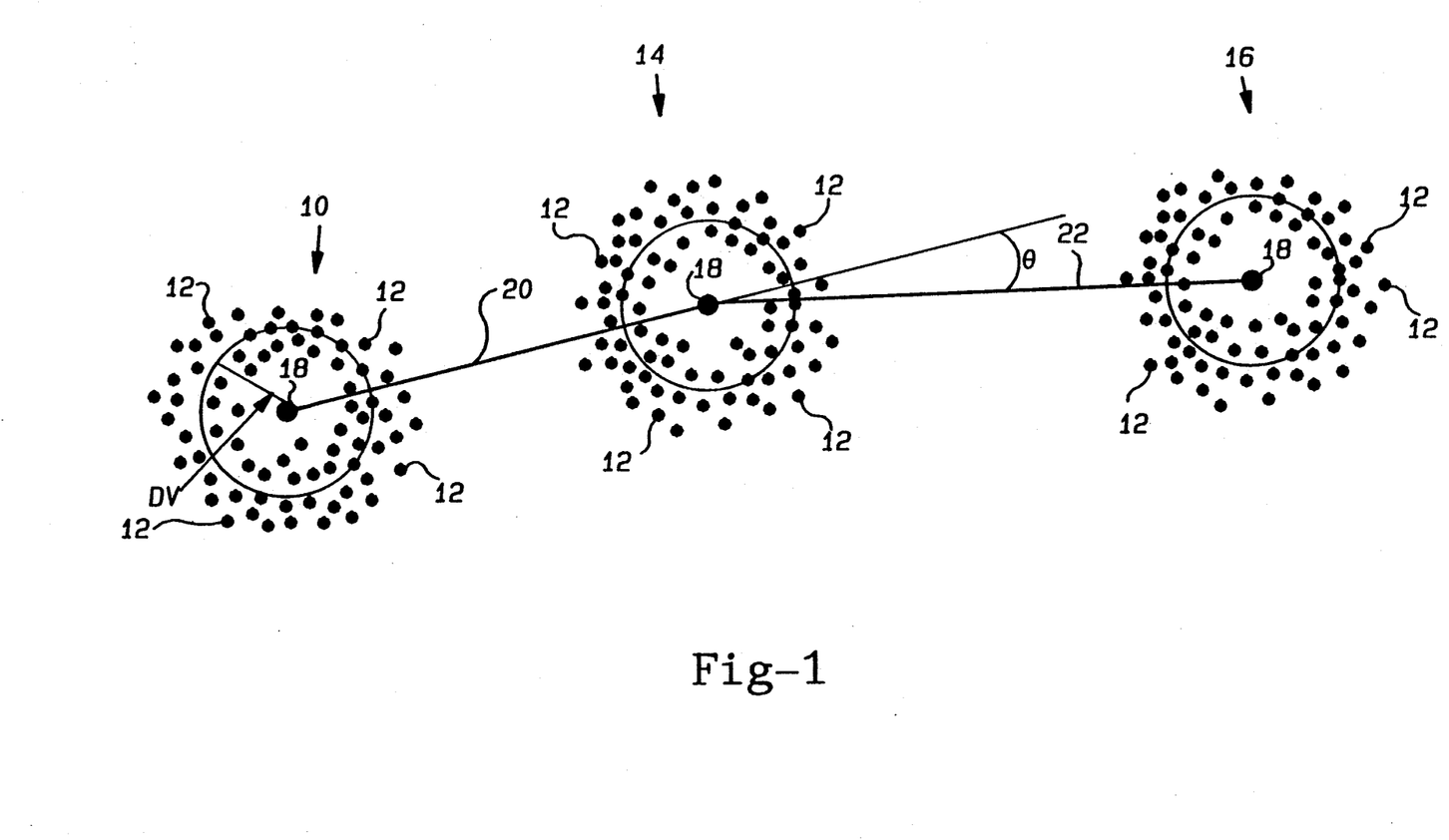
FIG. 1 is a diagram of an association problem involving multi-sensor and multi-scan data fusion addressed by the present invention.

In accordance with the teachings of the present invention, a system and method is provided for performing high dimensionality data association for large number of data elements. One illustration of a problem of this type is shown in FIG. 1, which depicts the problem of multi-sensor, multi-scan data fusion. In this application, a group 10 of object reports 12 is detected at a given instant of time. At an instant of time later, the group has moved to the position shown by group 14 in FIG. 1. At a later instant of time the group of objects has moved to a third position depicted by the group 16 in FIG. 1.

The data fusion problem is two-fold: first, to determine the location of each object 12 at each of the three time frames in groups 10, 14 and 16, and second, to associate each object 12 with the corresponding object 12 in a successive time frame. When this is accomplished, the location of each object in each of the three time frames is determined and a trajectory, or track, can be drawn. For example, for object 18 at the center of group 10, the first problem is to determine its exact location based on sensor data, and the second problem is to associate object 18 in group 10 with object 18 in group 14 and then to again associate object 18 in group 14 with the same object 18 in group 16. Once this is done a pair of tracks 20 and 22 can be drawn connecting the object reports 18.

Once this is information is known for each of the object reports 12, a track can be initiated for each object report based on a ballistic angle Θ which can be used to predict the future course of motion of the objects 12. Additional information which is available from this analysis includes the velocity, which is proportional to the distance between object reports in the separate groups 10, 14 and 16 represented by the length of tracks 20 and 22. As will be discussed in more detail later, for short time frames, it can be assumed that the velocity is relatively constant from group to group so that the length of track 20 will be approximately equal to the length of track 22. This information will be used by the processor in accordance with the present invention to eliminate unlikely potential associations.

Figure 2:
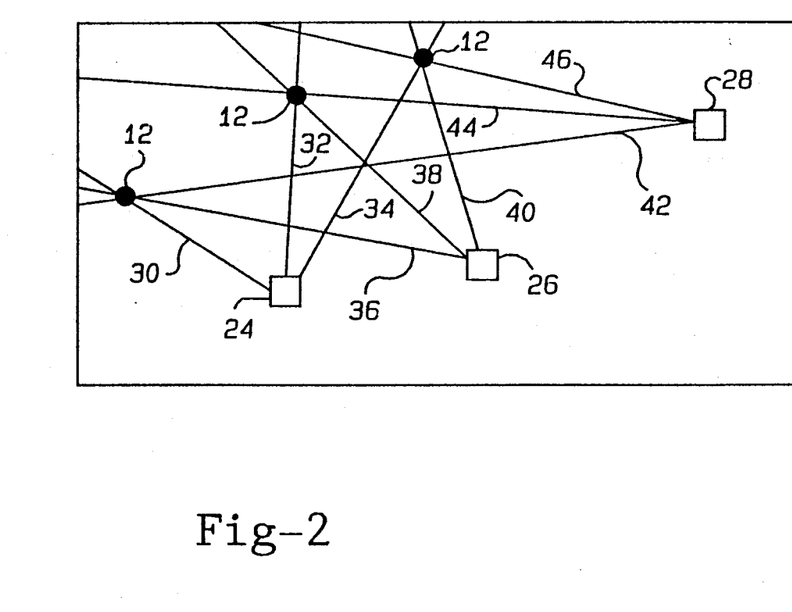
FIG. 2 is a diagram of a three sensor, three scan data fusion problem in accordance with the present invention.

It should be noted that while the problem illustrated in FIG. 1 has been discussed in terms of multi-sensor or the multi-scan data fusion problem, other data fusion and association problems arise in a number of settings in other applications such as those listed above. In accordance with the particular application used to illustrate the present invention, each object 12 is sensed by three sensors as illustrated in FIG. 2; that is, first, second and third sensors 24, 26 and 28, which may comprise, for example, angle only infrared sensors. Each sensor generates angle only data associated with objects detected at three time frames. In particular, an object 12 is detected at three success intervals of time along nine strobe lines 30–46, three from each of the three sensors 24, 26 and 28. Thus, object 12 is first detected by the three sensors along strobe line 30 of sensor 24, strobe line 36 of sensor 26 and strobe line 42 of sensor 28. The point at which these three strobe lines intersect represents the location of an object 12.

In attempting to process the data illustrated in FIGS. 1 and 2, two primary problems arise which are addressed by the present invention. The first is sometimes referred to as the deghosting problem. That is, while in the above discussion it has been assumed that each triple intersect corresponds to an object 12, it is well known with data of this type that multiple triple intersects will occur along single strobe lines. Consequently, the processor must be able to associate the correct strobe lines and eliminate the ghosts. One clue as to which triple intersects are real and which are ghosts is given by the assumption that the farther away the strobe lines are from actually intersecting, the less likely they are to represent an actual object. For large numbers of objects the deghosting problem becomes extremely computation intensive.

Even when the deghosting problem is solved a second problem with data of this type arises. This is the uncertainty of knowing which successive object reports 12 in successive time frames correspond to the same object. Where a large number of objects exist in a group, for example, 100,000 objects, the dual problem of deghosting and associating object reports from multiple scans becomes formidable indeed.

Nevertheless, the association problem becomes even more difficult when the sensor data to be fused, (the angle only data from sensors 24, 26 and 28) instead of representing only single angles, represents a pair of angles designating an azimuth and elevation angle position in three dimensional space for each object report 12. That is, FIG. 2, for sake of simplicity, strobe line represents the problem in two dimensions with each sensor strobe 30-46 representing a single angle from each sensor. The more difficult problem addressed by the present invention will be the three dimensional case where each strobe 30-46 represents a two dimensional data value designating the azimuth and elevation of the object report.

In analyzing this problem, it is noted that the only information available is spatial, temporal, and structural. That is, spatial information is available in the form of multiple sensor views of the same object at a given time. Temporal information is present in the form of multiple scans spaced over regular time intervals. Structural information is available by considering the spatial arrangement of objects as seen by a single sensor within a given scan. That is, referring to FIG. 1, the position of any object 12 with respect to other objects 12 in a cluster will not change significantly from scan to scan at successive time intervals. The present invention combines all three types of information, via a massively parallel, highly-interconnected constructive architecture which arrives at a total minimum assignment error corresponding to an optimal nine dimensional assignment, resulting in initiation of three dimensional tracks. The problem is nine dimensional because for each object, there are nine pieces of data: three sets of sensor angles at a first time frame, three sets of sensor angles at a second time frame, and three sets of sensor angles at a third frame. The present invention can be implemented using available digital electronic technologies, in an architecture which is scaleable to handle any number of objects. In addition, the processing is highly parallel with few processing elements standing idle during processing. Further, the present invention performs multi-scan and multi-sensor association simultaneously, rather than sequentially.

The present invention can be classified as a neural network type of structure partially because it includes the embodiment of "algorithm as architecture". In addition, it shares the following six features with neural networks: 1) Many simple (often non-linear) parallel distributed processing elements; 2) Many structured (often adaptive) interconnect elements; 3) Excitatory and/or inhibitory signals, often involving feedback; 4) Refractory (processing/time delay) mechanisms within the structure; 5) Ability to handle and use system or environmental noise in processing; and 6) Some degree of fault-tolerance due to distributed processing structure. A more appropriate label may be "connectionist", however, in the sense that the present invention does not reflect any specific biological neural structure, nor does it stem from any particular artificial neural network structures developed to date. In addition, the present invention involves an approach to the data association problem that goes beyond a simply a massively connected (fixed or trainable) architecture. That is, the present invention uses a novel association-by-construction/destruction technique governed by controlled random processes to perform the nine dimensional association task.

Models of processes occurring in nature have proved useful in developing new computing technologies. For example, many useful computing architectures have evolved out of our understanding of biological neural networks. Similarly, our understanding of crystallization processes occurring during a annealing has yielded the useful computational models, Simulated Annealing and the Boltzman Machine. Knowledge of genetic processes has resulted in another area of computing known as genetic algorithms. In the same vein, the present inventor, in the course of developing the invention disclosed herein, has discovered the utility of modeling computing processes after the molecular forces of attraction which result in the formation of molecules. Because of this, the present invention will be introduced and explained in terms of a chemical reaction model.

Figures 3A, 3B:
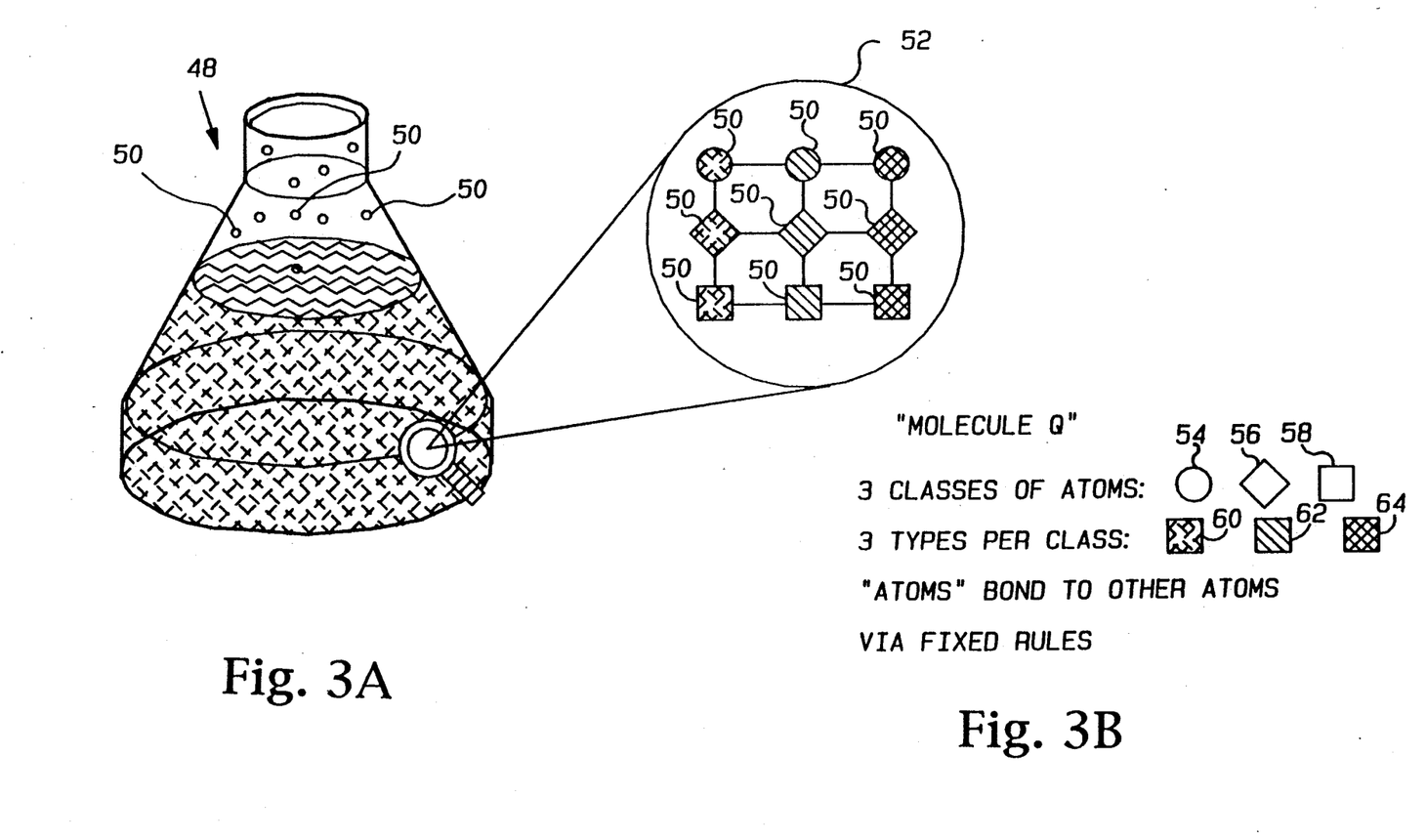
FIGS. 3A and 3B are a diagram of a molecular model used to solve association problems in accordance with the present invention; addressed by the present invention FIGS. 4a–4c further illustrations of the molecular model for solving the association problems shown in FIG. 3A.

Referring now to FIG. 3, the spatial-temporal-structural (STS) processor 48 in accordance with the present invention can be considered to be analogous to a closed system chemical reaction in which multiple "atoms" 50, each representing two dimensional object reports from each of three scans from each of three sensors, 24, 26, 28, are mixed together in solution until equilibrium is reached. This equilibrium represents a minimum potential energy, corresponding to optimal association of object reports into N nine dimensional "molecules" 52, where N represents the total number of objects. In essence, this is simply a restatement of the general data assignment, or association problem: assign all $N \times M$ data elements in an M dimensional space in such a way as to minimize some cost, or alternatively, maximize some payoff.

However, the STS processor 48 does not simply represent a neural network, or connectionist approach to implementing conventional simulated annealing, gradient descent, or dynamic programming techniques for optimization. It is a novel technique which uses a connectionist architecture to minimize the computational time required to form a globally optimal assignment via multiple parallel locally optimal assignments which are constructed and "disassembled" in terms of locally available information only. A fundamental difference between the STS 48 and the majority of conventional optimization techniques is the use of randomized local construction of assignments to achieve global optimization. Further, "destruction" of previously made assignments, or associations in favor improved local "cost", is another unique feature of the STS 48. With respect to the convergence properties of the STS 48, it is a non leaner dynamical system, and therefore extremely difficult to analyze theoretically. As a result, its convergence properties are generally determined experimentally.

Referring again to FIG. 3, each atom 50 consists of a single two dimensional object report. Each "atom" has both a class and a type. Each class is indicated by the shape of the atom (circle 54, diamond 56, or square 58) and corresponds to a particular scan of sensor data. That is, the circle represents a first scan, diamonds 56 represent a second scan, and squares 58 represent a third scan. Each type per class is indicated by the three types of shading 60, 62, 64, and corresponds to the particular sensor from which the object report originates.

The basic function of the STS processor 48 is to associate or bond nine x N objects of these atoms 50 into a "chemical solution", which will transition from an initial state of high potential energy (randomly mixed) to a final low potential energy (equilibrium) state, in which N molecules have been formed from the nine x N atoms. Molecule formation is constrained to allow association of nine different atoms only, that is, the different classes and types of atoms may combine in only one way to form each nine dimensional molecule 52. Each molecule 52 represents a potential association of object reports which permit tracks 20, 22 to be initiated for a single object.

Figures 4A, 4B, 4C:
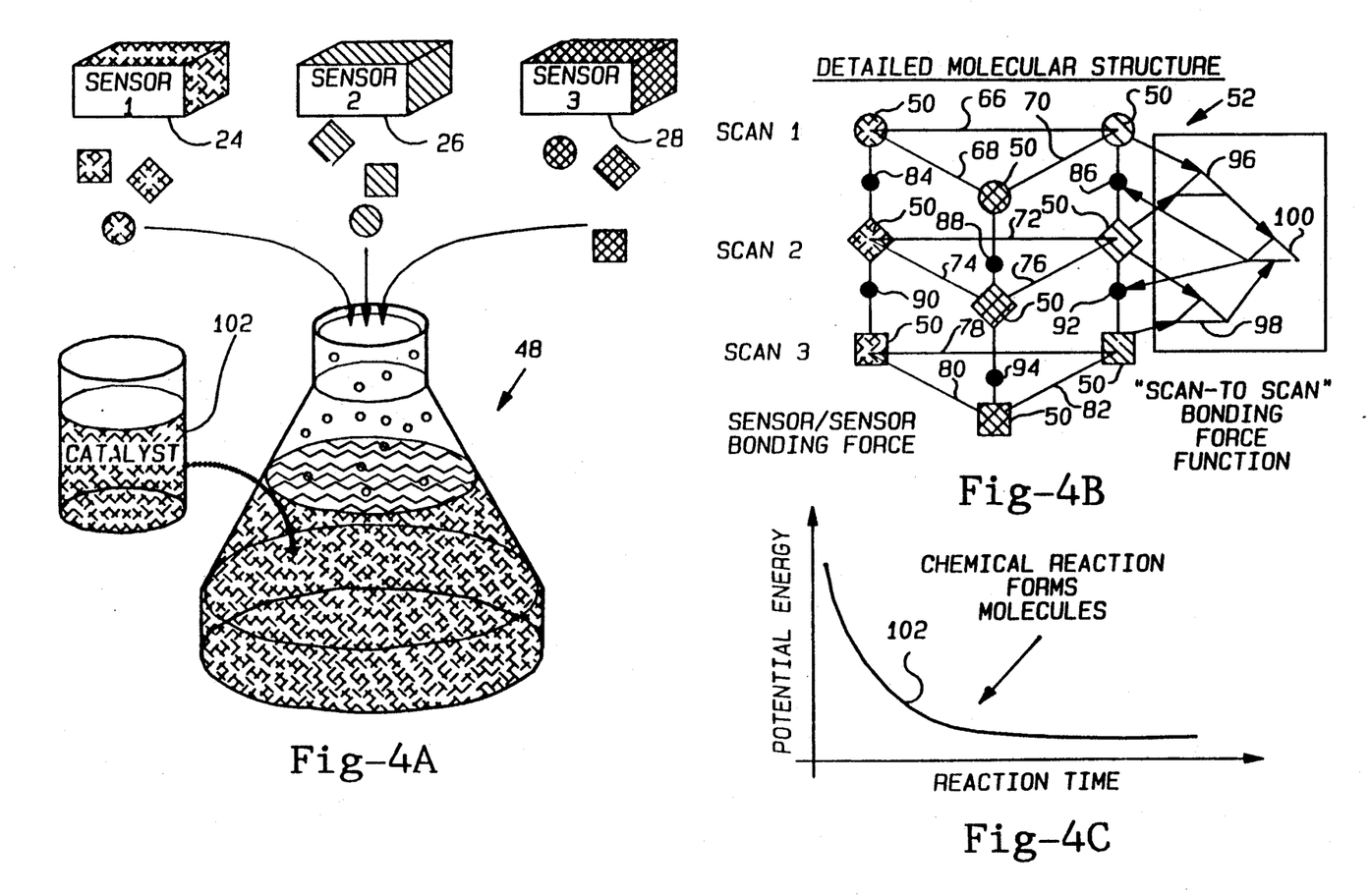

The goodness of this solution, that is, whether these nine object reports represent the same object, is reflected in the stability of the molecule 52. If the molecule 52 is unstable, then the atoms 50 do not associate well because they belong to different objects. The instability arises from the unbalanced "valences" among the atoms. In STS processor 48, the valences reflect spatial, temporal, and structural values for the particular combination of nine atoms as illustrated in FIG. 4a. These spatial, temporal and structural values reflect assignment cost in the sense of a standard minimization function. Spatial stability is embedded in the "horizontal balances" as a function of the minimum distance between vectors drawn form each sensor to the specific object reports comprising the atoms 50 currently within the molecule 52. This is computed as a minimum distance calculation between three pairs of two vectors in three space.

In more detail, FIG. 4a illustrates three atoms 50 from each of the three sensors 24, 26, 28 entering the STS processor 48. Atoms having the same shading come from the same sensor, while atoms having the same shape come from the same scan. Spatial stability, embedded as horizontal valences, is illustrated in FIG. 4b by the lines connecting atoms from different sensors within the same scan. For example, lines 66, 68 and 70 represent horizontal valences for scan 1; lines 72, 74, 76 represent horizontal valences for scan 2; and lines 78, 80 and 82 represent horizontal valences for scan 3.

These horizontal valences, or bonding forces, are proportional to the distance between three strobe lines at their point of nearest approach. For example, referring to FIG. 2 for scan one, the sensor/sensor bonding valence, represented by valences 66, 68 and 70 represent the distance between strobe lines 30, 36 and 42 at their point of nearest approach. It should be noted that in FIG. 2 these three lines 30, 36 and 42 are shown to intersect at object 12. In fact, however, due to errors in the sensors and measurement systems, these lines will not actually intersect in three-space but instead will approach each other closely where an object 12 exists. On the other hand, if the triple intersect of these lines represents a ghost and not a real object, inherent in the STS processor 48 is the assumption that these strobe lines will be more separated than for true objects. Thus, in this way this minimum distance calculation or sensor/sensor bonding force is the measure of the likelihood that the particular triple intersect represented by these three strobe lines is an actual object and not a ghost. Likewise, the above discussion applies to the horizontal valences between sensors in scan two and in scan three.

Temporal stability is embedded in the "vertical" valences as a function of scan to scan distance for a single sensor. In FIG. 4, vertical valences are represented by dots 84, 86, 88, 90, 92 and 94. Temporal stability is based on the assumption (discussed previously in connection with FIG. 1) that the velocity from scan to scan of an individual object is constant. That is, in FIG. 1 the length of track 20 should be approximately equal to the length of track 22. The greater the difference in this length, the greater the difference in velocity from scan to scan, and the greater the likelihood that the object reports from scan to scan belong to different objects. That is, the distance in 2D from scan one to scan two should be approximately equal to the distance in 2D space from scan two scan three for the atoms currently within the molecule 52. The distance from scan one to scan two is represented by force function, triangle 96 which represents a sum of the force functions from the three scan one atoms to scan two atoms 84, 88, 86. The distance between the scan two to scan three atoms is represented by force function triangle 98 which represents a sum of the bonding forces 90, 94, 92. The difference between the scan one to scan two distance and the scan two to scan three distance is represented by the force function triangle 100.

Structural stability is not embedded directly as a valence, but rather acts as a catalyst to the molecular formation process, shown schematically as catalyst 102 in FIG. 4a. In this structural stability contributes to the mobility of the atoms in the mixture. Assuming that the structure of the arrangement of two-dimensional object reports will vary in only a minor way from scan-to-scan, a measure of a particular object's position relative to all other objects in the scan may be used to determine the degree to which a given object report on subsequent scans corresponds to the same object in the previous scan. For example, the Euclidian distance from an object to the centroid of all objects reported in scan 1 may be compared with the same measure obtained for each object report in scan 2. An object in scan 2 whose distance measure is closest to matching the object in scan 1 has a high likelihood of being the same object.

The process that the STS processor 48 takes to achieve nine dimensional association emulates, in a very loose sense, the local combination and dissolution of atoms into unstable molecules, the spread of atoms and molecules in solution, and the final settling of the solution or mixture, to a low energy state of equilibrium. This process is illustrated in FIG. 4C where curve 102 decreases exponentially as reaction time increases. That is, potential energy represented by scan-to-scan bonding forces and sensor-to-sensor bonding forces reduces and settles into a equilibrium state. By applying randomness in selecting atoms to be used in local molecule construction processes, the STS 48 emulates a shaking, or stirring, of the chemical solution to obtain uniform opportunities for all of the atoms to combine in the most effective way.

All of these forces contribute simultaneously to the stability or instability of the molecule 52. This simultaneous use of all available information, computed locally within a globally (virtual) interconnected architecture results in rapid high accuracy fusion of 9 X N 2D object reports into N potential track initiations. The underlying tenant of the STS 48 processor is to use all available data simultaneously - and specifically not to perform association of scan-to-scan information independently of sensor-to-sensor information.

Figure 5:
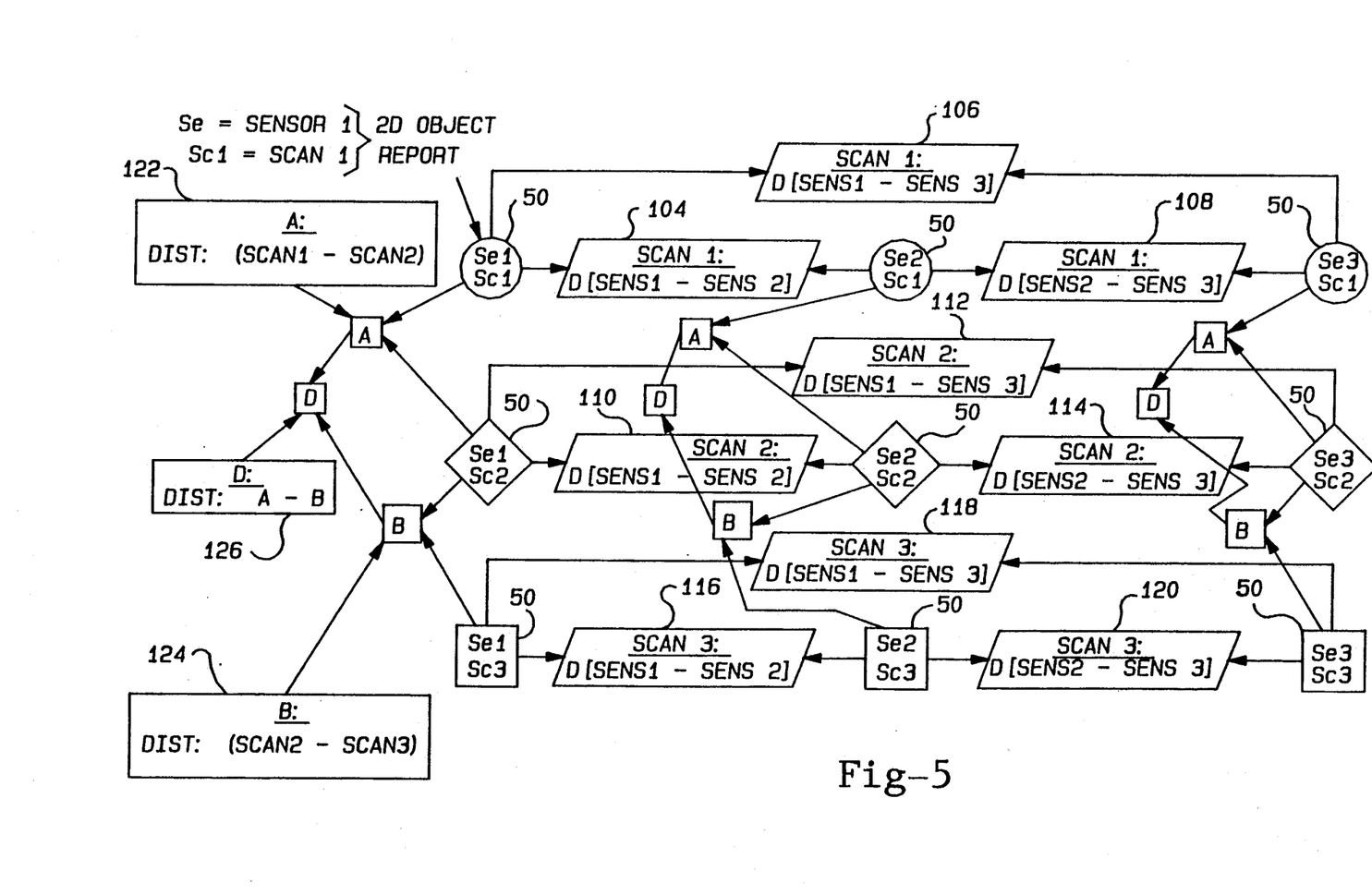
FIG. 5 is a diagram of the calculation of sensor/sensor and scan to scan forces in accordance with the molecular model shown in FIGS. 3A and 4A–4C.

Referring now to FIG. 5 there is shown a detailed diagram of the valences or distance computations within the nine dimensional molecule 52. The nine atoms 50 shown in FIG. 4B are represented in FIG. 5 without shading for sake of simplicity while maintaining the unique shapes corresponding to different scans. As in FIG. 4b, horizontal interconnects correspond to cross-sensor correlation. Vertical interconnects correspond to scan-to-scan correlation. In particular, the distance computation forming scan 1 sensor-to-sensor bonding force 66 between sensor 1 and sensor 2 is represented by block 104 in FIG. 5. The bonding force between sensor 1 and sensor 3 (68 in FIG. 4B) is represented by block 106 in FIG. 5; while bonding force 70 is FIG. 4B is represented by block 108 in FIG. 5. Likewise, for scan 2, forces 72, 74 and 76 are represented by blocks 110, 112 and 114 respectively and scan 3 forces 78, 80 and 82 are represented by blocks 116, 118 and 120.

Vertical valences, or scan-to-scan bonding forces shown in FIG. 4B as circles 84–94, are illustrated in FIG. 5 by functions A and B. That is, A as shown in block 122 represents the difference between scan 1 and scan 2 in distance while the B function represented by block 124 is calculated as the distance between scan 2 object reports and scan 3 object reports. The overall scan-to-scan bonding force function which is the difference between the scan 1 to scan 2 difference and the scan 2 to scan 3 difference, shown by force function 100 in FIG. 4B, is represented by function D is FIG. 5 function D is illustrated in block 126 as the distance between the A and B distances.

Figure 6:
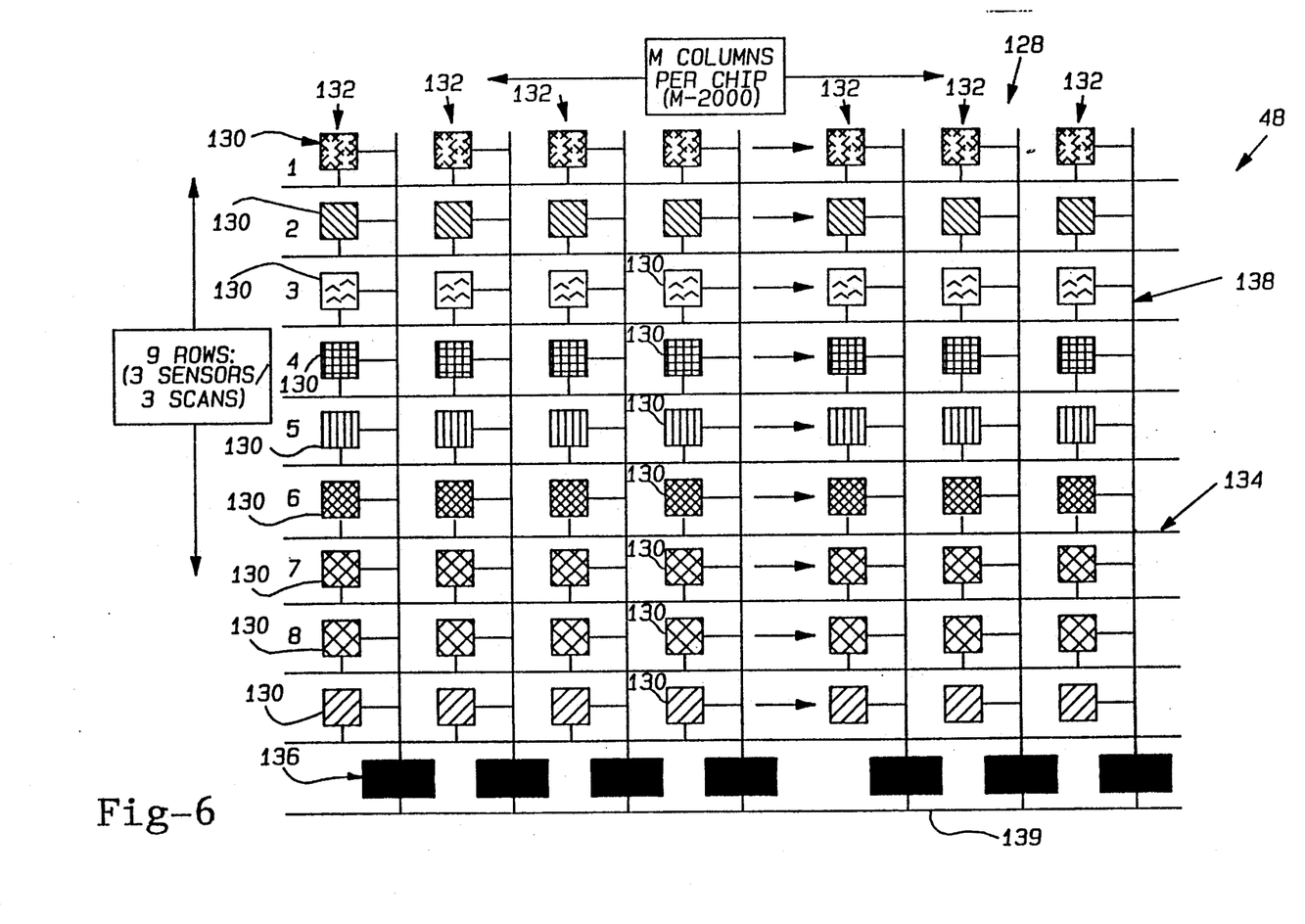
FIG. 6 is a diagram of a spatial-temporal-structural (STS) processor processing element in accordance with the present invention.

Referring now to FIG. 6 a processing element 128 for a hardware embodiment of the STS processor 48 is shown. The STS processing element 128 comprises a regular arrangement of simple memory cells 130 arranged in a cartesian bus grid. This arrangement provides easy scaleability by simply cascading processing elements 128 into a larger structure as discussed below. Each memory cell 30 contains a two-dimensional object report (azimuth, elevation) for a given sensor and scan. Each column 132 contains one representative of each type of object report from each sensor and each scan. That is, each memory cell 130 in each column 132 contains a different scan/sensor combination, represented by the nine different kinds of shading in each column. For example, they may be arranged as follows: sensor 1, scan 1 object reports (strobe line 30 in FIG. 2) all go in the top row labeled 1; sensor 1, scan 2 in row 2; sensor 1, scan 3 in row 3; sensor 2, scan 1 in row 4; sensor 2, scan 2 in row 5; sensor 2, scan 3 in row 6; sensor 3, scan 1 in row 7; sensor 3, scan 2 in row 8; and sensor 3, scan 3 in row 9. Each column 132 corresponds to a molecule 52 which represents one grouping or association of nine atoms or object reports. There are M columns in the STS processor 48 corresponding to M objects to be detected.

The overall operation of the STS processor 48 is to first load all 9 X M object reports into 9 X M memory cells 130 in a random fashion. The object reports are then shifted from memory cell to memory cell within rows until an optimum arrangement is found which minimizes scan-to-scan and sensor-to-sensor forces among all of the molecules or columns. When an optimum solution is found each column will represent nine object reports for a single object permitting tracks to be initiated for each object.

The object reports are initially loaded into the memory cells 130 by means of an I/O, data and control bus 134. In addition, the I/O data and control bus 134 permits the object reports to be shifted from memory cell 130 to memory cell 130. Computation of scan-to-scan and sensor-to-sensor bonding forces for each column are calculated by energy computation cells 136, which are connected to each memory cell 130 by means of data bus 138. In particular, the energy computation cells 136 calculate the sensor-to-sensor distances as illustrated in FIG. 5 and the scan-to-scan distances as illustrated in FIG. 5 for each column. The energy computation cells 36 operate in parallel and transmit their results along a result bus 139 to the rest of the STS processor 48.

Figure 7:
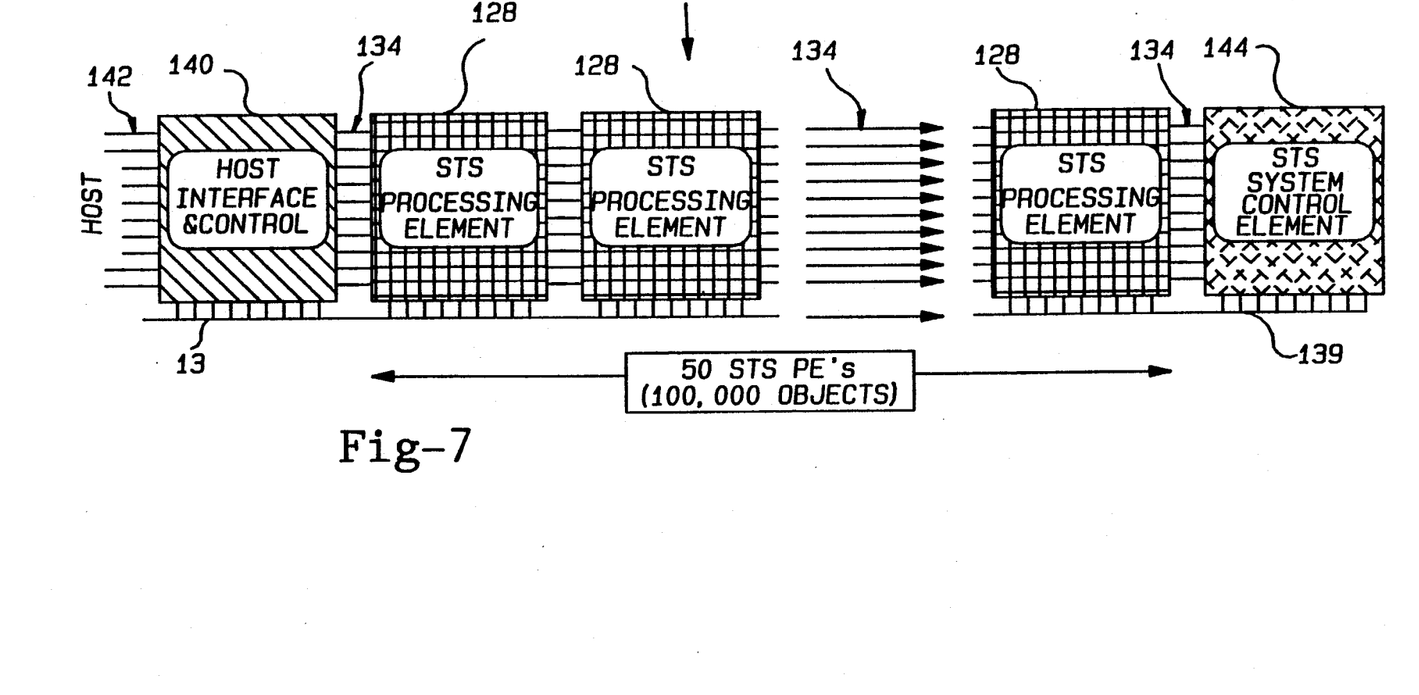
FIG. 7 is a system diagram of the spatial-temporal-structural (STS) processor incorporating multiple processing elements in accordance with the present invention.

Referring now to FIG. 7, a diagram of a hardware implementation of the STS processor 48 employing multiple identical processing elements 128 is shown. Multiple STS processing elements permit the STS 48 to process any given number of object reports in parallel. For example, where each STS processing element has 2,000 columns, 2,000 object reports can be processed by each processing element 128. As shown in FIG. 7, 50 STS processing elements may be utilized, thereby giving the STS processor 48 the capability of processing 100,000 object reports.

Initially, a host computer (not shown) receives, stores and transmits the two-dimensional sensor data to a host interface and control module 140 by means of a host bus 142. The host interface module 140 handles data, I/O, control functions for transferring the sensor data to the STS processing elements 128 by means of the I/O, data and control bus 134. In addition, the host interface and control module 140 handles the STS 48 and host synchronization functions. In particular, this involves data flow and processing control. The host interface and control module 140 is also coupled to the result bus 138 to permit information regarding the resulting state of the STS processor 48 to be transmitted. The final STS processing element 128 is coupled by means of I/O, data, and control bus 134 to the STS system control element 144. The STS system control element 144 provides the following functions: synchronization; data movement control; thresholding; mobility computation; convergence detection; and random number generation. These functions will be discussed in more detail below. The STS system control element 144 is also coupled to the result bus 138 for receiving information from the energy computation cells 136 and also for transmitting convergence detection information back to the host interface and control module 140.

Figure 8:
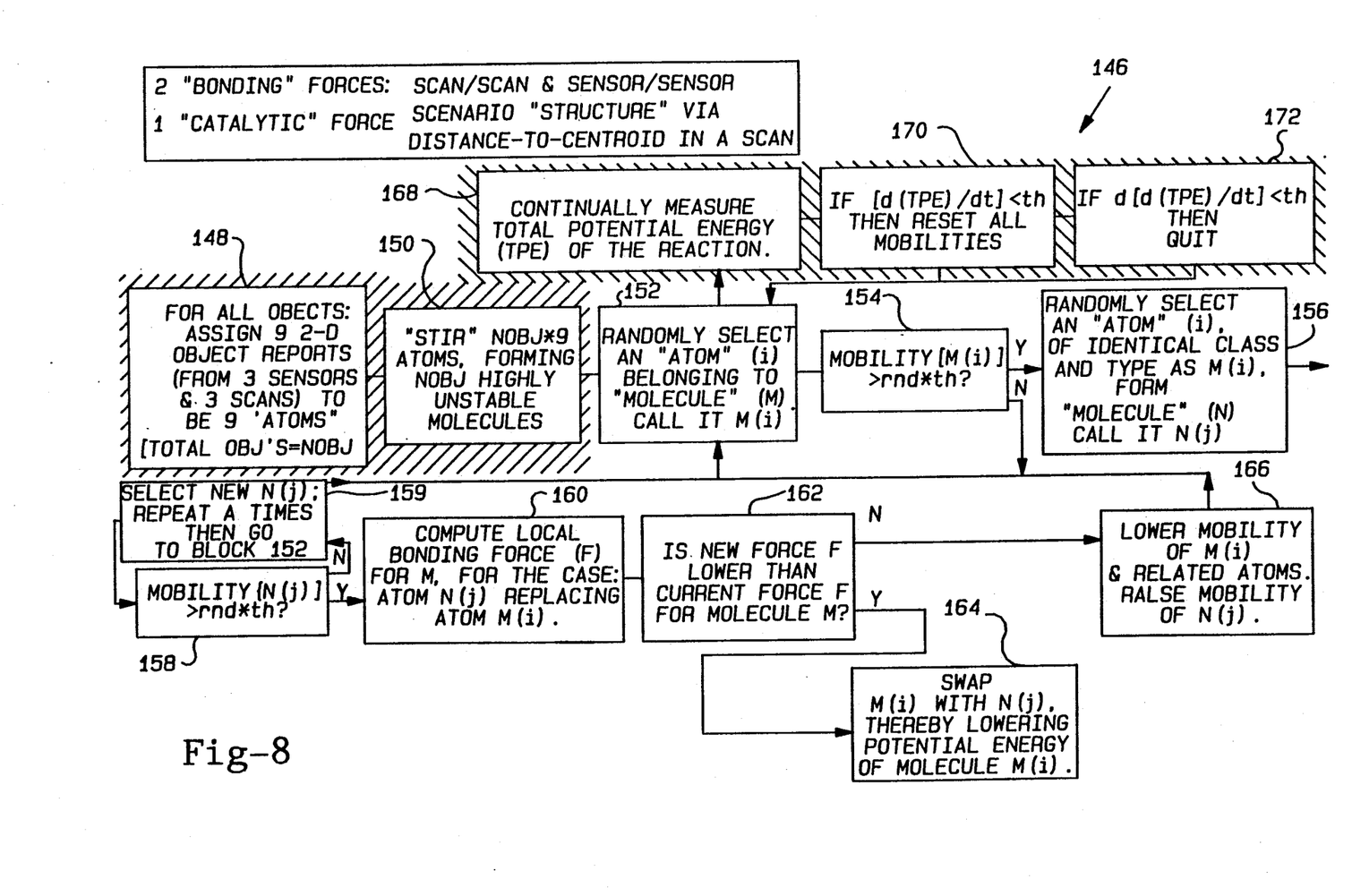
FIG. 8 is a flow chart illustrating the steps performed by the spatial-temporal-structural processor in accordance with the present invention.

Referring now to FIG. 8, there is shown a flowchart 146 of the STS system 48 processing flow. The flowchart 146 generally describes the sequence of operations under the control of the STS system control element 144. It should be noted that the general approach is sequential, that is, atoms are processed one at a time. It will be appreciated however that portions of the architecture are parallelizable to increase throughput.

Overall, the flowchart 146 provides a method for calculating the three above-discussed forces: the scan-to-scan bonding forces; the sensor-to-sensor bonding forces; and the scenario structure via distance to centroid catalytic force. Initially, as shown in block 148 for each object to be detected represented by a single column 132 in the STS processing element 128, nine two-dimensional object reports (from three sensors and three scans) are assigned to be nine "atoms". That is, as discussed above, each horizontal row in the STS processing element 128 is assigned to one class and type of atom. The total number of columns in the STS system 48 will be equal to N, the total number of objects, there being nine N total object reports, one for each memory cell 130 in a row. Block 150 then specifies figuratively "stirring" the 9N object reports into the nine N memory cells 130 in a random arrangement. It will be appreciated that some preprocessing could be employed to preassociate object reports occurring in the same vicinity to perhaps speed up the processing of the STS processor 48. However, a random initial arrangement is employed herein for the more general case of data in which nothing is know beforehand about the association of the individual two-dimensional object reports. The loading of object reports into the memory cells 130 is accomplished by the host interface and control module 140 in conjunction with the STS control element 144. As noted in block 150 the random arrangement results in unstable "molecules", which means that each column has a relatively high energy as computed by energy computation cells 136.

Next, in block 152 the STS system 48 randomly selects an "atom" (i) belonging to "molecule" (M) designated as M(i). Each atom, or object report, will have a numerical value called a "mobility" associated with it. This number may be assigned by the STS system control element 144 and stored in each memory cell 130 along with the azimuth and elevation angles. Mobility refers to the availability of an individual atom for bonding within any molecule in the STS 48 structure. Initially all atoms are set to a high mobility, modified with slight additive noise in order to avoid data-order biases which could cause premature convergence to local minima due to the sequential nature of the processing. Thus, initially the STS system control element 144 may set all mobilities to the same maximum value or to high but randomly varied values. Later on in the flowchart 146 mobility will be modified as a function of total force (energy) within the molecule, and structural information (the relative position of an object to the other objects in a scan). As a result of the processing flow in flowchart 146 if a molecule is highly unstable the mobility of the atom which contributes to that instability is high, encouraging movement of that atom out of that molecule. If the molecule is very stable, that is, has very low energy (or high bonding force), the mobilities of all the atoms comprising that molecule are very low as a result of mobility adjustments. In both cases, structural information (e.g., the matching of an object's positions relative to each other or to a common within scan centroid) is applied to the computation of mobility as described below.

Block 154 checks the mobility of the previously selected atom (selected in block 152) and determines if it exceeds some random number multiplied by a predetermined first threshold. This first threshold is one of four thresholds used in the STS processor 48 to control convergence of the system. These thresholds correspond to the nonlinearities required to control convergence found in both biological and artificial neural networks. Thus, in the STS processor 48 the thresholds provide a means for providing external control over the STS 48 processing. While the preferred embodiment uses fixed thresholds it will be appreciated that adaptive thresholds may also be employed and may provide faster, or higher accuracy convergence. Further, the thresholds in the STS processor 48 employ additive noise in order to avoid local minima. That is, each time block 154 is performed, the first threshold is multiplied by a random number, "rnd", for example, uniformly occurring numbers between zero and one. By occasionally permitting poor solutions to occur, the use of noise or randomly varying thresholds, helps the STS processor 48 avoid getting stuck in local minima of total energy on its path to an absolute energy minima.

In block 154, the first threshold is used to determine whether an atom's mobility is high enough to warrant separation from its present site in the molecule, in search of a lower energy site on some other molecule. If block 154 determines that the mobility is not greater than the random number times the first threshold, the process flow proceeds back to block 152 to select a new atom M(i). While initially all of the mobilities set to high values, the existence of the random number will cause block 154 to occasionally select the "no" path even for these initially high mobility atoms.

Where block 154 determines that the mobility is greater than the random number times the first threshold, then block 156 selects an atom (i) of identical class and type as M(i) from a different molecule (N) and labels this atom N(j). For example, if M(i) is in row 1, another atom, or memory cell 130, in row 1 is selected at random by block 156. Next, block 158 checks the mobility of the selected atom in N(j) to see if it is greater than a random number multiplied by a second threshold. This check determines if the mobility of an atom currently residing in the randomly selected new site is high enough to warrant a swap with the first atom M(i). If block 158 determines that the mobility of atom N(j) is too low, then the process flow 146 proceeds to block 159 and a new atom N(j) is selected. This happens because as described below, lower mobility atoms are associated with low energy molecules and it is desired to not disturb that molecule. The loop of block 158 and 159 is repeated until a high enough mobility N(j) is found (yes output of block 158) or the loop has been repeated A number of times after which the flow proceeds back to block 152, and a new atom M(i) is selected.

On the other hand, if block 158 determines that the mobility M(j) is high enough, the processing proceeds to block 160 where the energy computation cell 136 associated with the column where M(i) resides, computes the local bonding force F for molecule M for the case of atom N(j) replacing atom M(i). The term force is used interchangeably with energy. As discussed above, energy computation cells 136 calculate scan-to-scan and sensor-to-sensor forces for the nine atoms in the column to which it is connected by the data bus 138. The energies are computed as follows. The scan-to-scan energy is a simple signed difference of differences of candidate object positions. That is, $$E = [S1(x,y) - S2(x,y)] - [S2(x,y) - S3(x,y)],$$

where E equals valence energy (scan-to-scan) and Sn(x,y) is the (az,el) position of an object in scan n for a given sensor. This computation assumes that in the ideal case, E equals zero corresponds to constant velocity of the object from scan-to-scan. In fact, this is not likely to happen due to sensor or platform errors or slight variations in the actual objects velocities.

The sensor-to-sensor energy is a simple distance computed at the closest point of approach of two lines in three space. This distance is computed for all three combinations of two sensors using the sensor position and the object report (az, el) to define the lines. This computation assumes that in the ideal case, E=0, corresponding to all three sensor/object lines crossing at a single point in three-space, e.g., at the precise position of the actual object. In fact, this is not likely to happen due to sensor or platform errors, and the difficulty of synchronizing sensor scans. It should be noted that this embodiment of the STS processor 48 assumes exactly synchronized sensors and some modification will be necessary to accommodate non-synchronized scanning.

The energy computation cell 136 will first compute the energy for molecule M with atom M(i) and then will calculate the energy for the case of atom N(j) replacing atom M(i) in block 160. Next, the processing flow 146 proceeds to block 162 where the newer force F is compared to the current force F for molecule M. That is, block 162 asks whether the replacement of atom M(i) by atom N(i) lowers the force computed by the energy computation cell 136. If it does, block 164 swaps M(i) with N(j) thereby lowering the potential energy of molecule M. This means that the azimuth, elevation and mobility associated with these atoms are transferred from one memory cell to the other. Next, block 166 will lower the mobility of the new M(i) (memory cell 130 of molecule M where the swapped N(j) has been inserted) and related atoms. Related atoms are those atoms which contributed to the new force calculated by the energy computation cell 136 when N(j) was inserted. For example, referring to FIG. 4B, atoms related to the atom from sensor 1 scan 1 are the two other atoms from scan 1 and the two other atoms from sensor 1 since these are all used in the energy computation. Thus, block 166 lowers the mobility not only of the currently residing atom in M(i) which contributed to the lower energy for the molecule but also those atoms which were used in the computation with that particular atom to result in a lower energy for the molecule. Thus, the mobility is lowered for these atoms because it is desirable to keep them where they are since they contributed to an improved solution.

If on the other hand in block 162 it was determined that the new force was not lower than the current force, there will be no swap and step 166 will lower the mobility of the original M(i) and the atoms to which it is related. Since the unswapped M(j) atom did not improve the solution from molecule M its mobility is raised to encourage its use in other molecules in potential swaps. The amount that the mobility is lowered is a function of scenario structure as computed for M(i) and related atoms in molecule M. It should be noted that the use of scenario structure to lower mobilities is not essential to the operation of the STS 48 but operates as an enhancement. To illustrate this process reference is made to FIG. 1 where it can be seen that for this kind of data the position of an object report 12 with respect to other object reports does not significantly change from scan-to-scan. Using this information about the scenario structure thus helps in detecting good solutions from bad solutions. One way to do this is to measure the distance from a particular object report to a calculated centroid of the cluster.

For example, an object report 18 may be considered to be the centroid and a distance DV may be used as a distance to centroid measurement. One way to do this would be to associate a distance to centroid number with each object report and when block 166 is lowering mobilities the correlation between this distance to centroid number from scan-to-scan would be determined. If there is a relatively good match in distance to centroid numbers, the mobility is lowered by a greater degree indicating a good solution. If on the other hand there is a strong mismatch between distance to centroid numbers, mobility will not be lowered so much. For example, if the atom moved from the upper left hand corner of the object reports to the lower right hand corner from one scan to another that would indicate a likely incorrect solution. Thus, for that atom the mobility will not be lowered as much to encourage that atom to migrate to other molecules in search of better solutions during the processing flow 146. After block 166, the processing flow 146 proceeds back to block 152 and a new atom (i) is selected (which may or may not belong to a different molecule) at random for potential swapping.

Each time the processing flow 146 goes through block 152, blocks 168, 170 and 172 will be performed. Block 168 measures the total potential energy of the reaction. In other words, the total energy calculated by all of the energy computation cells 136 in STS processor 148 are summed up and measured by the STS system control element 144. Total potential energy is continually monitored to determine descent into local minima which will require mobility reset setting and/or to determine convergence to solution. In particular, block 170 determines the derivative of the total potential energy (TPE) over time and compares it to a third predetermined threshold. If the rate of change in TPE is less than the third predetermined threshold, then all of the mobilities of all of the atoms are reset. The rate of change of TPE is used rather than the absolute TPE to determine local minimal to avoid requiring a priori knowledge of data value bounds.

It will be appreciated that a slowing in the rate of change of TPE will be characteristic of local (or global) minimal. Resetting the mobilities will tend to "shake up" the processing to permit higher energy solutions to be reached which should have the result of permitting STS system 48 to emerge from local minima. If the system was in a local minima then, after resetting mobilities, the TPE 48 will again begin to change energy states and processing will continue. After mobilities are reset, the processing flow 146 returns to Block 152 to attempt further swaps. After a prescribed number of mobility resets (passes through Block 170), block 172 checks the rate of change of the rate of change (second derivative) of TPE to decide if final conversions has been reached by determining that the STS system 48 has reached an equilibrium point, and that (the prescribed number of mobility resets have not have any affect in bringing it out of the minimum. To do this block 172 compares the second derivative to a fourth predetermined threshold, and if this threshold is exceeded then the processing returns to block 152 to conduct further swaps. It should be noted that convergence refers to a state of the STS system 48 in which the TPE is either: a) no longer changing even though multiple mobility resets have occurred, or, b) at some preset minimal value. At convergence, the arrangement of atoms within each molecule defines the association of nine two dimensional object reports into a single point in nine dimensional space. The collection of N 9D points resulting from this process may then be used in a very straightforward post processing procedure by the host computer to form N track initiations in three-space. All of the information required is then present in the eighteen data values assigned defining each point in nine dimensional space. For example, tracks such as those depicted as 20 and 22 in FIG. 1 may be drawn for each object 12.

In accordance with a preferred embodiment of the present invention, each STS processing element 128 may be implemented on a single VLSI chip. Making a few assumptions, the performance of the STS 48 may be estimated. Assuming 0.001 degree sensor resolution in az and el (2×10-bits), three sensors, and three scans, this yields on the order of 23,000 sets of nine 2D object reports per STS processing element 128 chip. This assumes no other processing on chip and does not allow for bus real estate. However, given an order of magnitude further reduction to allow for these functions, will result in over 2,000 sets of nine 2D object reports per chip. For a 100,000 object assignment problem, this corresponds to fifty identical chips for the entire STS 48 processing architecture in addition to the control circuit needed for I/O and multi chip control. It should also be noted that due to the regular structure of the individual chips and the scaled up architecture, wafer-scale integration may be also used to implement the STS system 48.

To estimate the processing times for the STS 48, experimental evidence indicates that convergence (number of iterations) times will increase as a factor of ten times the number of objects. Assume that I/O time is directly proportional to N, that each STS processing iteration corresponds to allowing up to AxN atoms an opportunity to move among cells, and that each movement requires three thresholding operations. Further, it is assumed that energy computations occur completely in parallel with this processing, and so do not contribute any additional delay. Finally, it is assumed that each of these operations requires on the order of 30 nsecs (conventional technology). Then, total processing time may be computed as proportional to:

$$T = 10 \times [N + (9+3) \times N] \times 30 \text{ nsec}$$

For N=10, t=39 $\mu$sec. For N=100,000, t=0.39 sec. It should be noted that this estimate is based on the above assumptions and may vary for particular implementations in which these assumptions are not realized.

An important advantage of the STS system 48 is that some degree of fault tolerance will result due to its massive interconnect structure and local (distributed) processing approach. If any given element were to fail, the overall performance of the STS system 48 would be degraded proportionally. At the conceptual level, the STS 48 exhibits fault tolerant capability stemming from its distributed processing architecture. Even given engineering constraints, if one of the nine major row buses or one of the N column buses were to fail, the overall STS system would not fail completely. If one of the row buses fails, the nine dimensional association would degrade to an eight dimensional association. This means that one of the nine object observations (for three sensors and three scans) would be missing for all objects. On the other hand, if one of the column buses were to fail, the result would be that N minus 1 instead of N total associations would be made. The overall processing of the STS 48 would not be seriously affected in either case. Graceful degradation of performance is inherent in the overall conceptual and engineering embodiment of the STS 48.

It should also be noted that the basic chemical analogy for processing depicted in FIGS. 3 and 4 may be advantageously employed in other ways besides that disclosed in the preferred embodiment. For example, the basic concepts of calculating valence forces, "stirring", etc, may be employed in other variations of the STS 48. In addition, while the above preferred embodiment of the STS system 48 has been adapted to solve a track initiation problem for large numbers of two dimensional object reports, employing three sensors and three scans, it will be appreciated that the basic system can be adapted to different number of sensors, different numbers of scans, and for similar association problems besides track initiation.

Those skilled in the art can appreciate that other advantages can be obtained from the used of this invention, and that modifications can be made without departing from the true spirit of the invention after studying the specifications, drawings, and following claims.

What is claimed is:

1. A system for forming desired associations among a set of data values, each of said data values belonging to one of a plurality of classes and one of a plurality of types, said system comprising:
   an array of memory cells arranged in rows and columns, each memory cell storing one of said data values, said data values arranged in said memory cells, so that each column contains one data value of each possible combination of said classes and types;
   data bus means for transmitting said data values into and out of said memory cells;
   an energy computation cell for each column coupled to said data bus means for computing an energy value for each column, wherein said energy value is proportional to the likelihood that the data values in said column together comprise one of said desired associations;
   system control means connected to said data bus means and said energy computation cells for transferring said data values of a given class and type from one memory cell to another memory cell of the same class and type within a given row of memory cells, when said energy value for said column is lowered by said transfer;
   said system control means including a summing means for adding up all the energy values computed by said energy computation cells to determine a total energy value proportional to the likelihood that all columns contain desired associations of data values, and
   wherein each time said system control means transfers data values, said summing means determines the total energy value of all of said energy computation cells, whereby, the total energy value having a lowest total energy after successive transfers represents a state in which each column contains said desired associations of data values.

2. The system of claim 1 wherein said energy computation cells comprise a correlation means for computing a first correlation value between data values having the same type but different classes within a column, and also for computing a second correlation value between data values having the same class but different types, within a column; and
   wherein said energy value is equal to the total of said first and second correlation values.

3. The system of claim 2 wherein said data values are azimuth and elevation values from detection of objects by sensors, at a plurality of time sequences, each of said classes of data comprises data values from one of said time sequences, and each of said types of data values originate from one of said sensors; wherein said correlation means computes a first correlation value by measuring the difference in distance between two lines defined by the sensor position and the azimuth and elevation of the data values at the point of closest approach of the two lines for the same time sequence from different sensors, and said correlation means computes a second correlation value which is proportional to the difference in velocity of said object in successive time sequences of data from a single sensor.

4. The system of claim 1 further comprising a host computer coupled to said data bus means for storing two-dimensional data values and for transmitting said data to said data bus means.

5. The system of claim 4 further comprising host interface and control means coupled to said host computer and data bus means for transmitting said data values to said memory cells through said data bus means in a random distribution.

6. The system of claim 1 wherein said system control means further comprises a means for transmitting a mobility value to each memory cell, and mobility check means for comparing the mobility value of said memory cells with a predetermined threshold and for transferring data values from only memory cells having mobility values which exceed a predetermined threshold.

7. The system of claim 6 wherein said mobility checking means multiplies said predetermined threshold by a randomly varying number each time it makes said comparison.

8. The system of claim 6 wherein said system control means further comprises a mobility changing means for lowering the mobility value of the memory cell receiving the transferred data value and for raising the mobility value of the memory cell from which the transferred data value came.

9. The system of claim 8 wherein said mobility changing means further lowers the mobility value of selected memory cells in the same column as said memory cell receiving the transferred data, said selected memory cells comprising those cells having the same class, or the same type, as the cell receiving the transferred data.

10. The system of claim 8 wherein said mobility changing means comprises a structure determining means for lowering the mobility value an amount that is proportional to a computation based on the surrounding data values.

11. The system of claim 10 wherein said structure determining calculates a centroid of said data values in a specific class.

12. The system of claim 1 wherein said system control means further comprises energy minimum checking means for determining the rate of change of said summed energy, and mobility reset means for resetting the mobility of said memory cells to higher values if said rate of change of said energy determined by energy minimum checking means is below an energy change threshold.

13. The system of claim 12 wherein said energy minimum checking means further comprises a means for determining the second derivative of said summed energy, for determining when said second derivative is less than a second predetermined energy change threshold, wherein convergence of said processor is detected by minimal changes in said summed energy.

14. The system of claim 1 wherein said data values each comprise two dimensional data values.

15. A method for forming desired associations among a set of data values, said data values each belonging to one of a plurality of classes and one of a plurality of types, said method comprising:

providing an array of memory cells arranged in rows and columns, each memory sell storing one of said data values, wherein said data values are arranged in said memory cells so that each column contains one data value of each possible combination of said classes and types;

transmitting along a data bus, said data values into said memory cells;

computing an energy value for each column of memory cells, wherein said energy value is proportional to the likelihood that the data values in said column together comprise one of said desired associations;

transferring said data values of a given class and type from one memory cell to another memory sell of the same class and type, within a given row of memory cells;

determining if the energy for the column of the cell receiving the transferred data values is increased due to said transfer, and putting said transferred data values back in their original positions when said energy value is increased due to aid transfer;

summing all the energy values for each column to determine a total energy value proportional to the likelihood that all columns contain desired associations of data values; and repeating said step of replacing said data values, until a lowest total energy value is reached based on a predetermined criteria.

16. The method of claim 15 wherein said step of computing an energy value for each column further comprises the step of computing a first correlation value between data values having the same type but different classes, and computing a second correlation value between data values having the same class but different types within a column, wherein said energy value is equal to the total of said first and second correlation values.

17. The method of claim 16 wherein said data values are azimuth and elevation values from detection of objects by sensors, at a plurality of time sequences, each of said classes of data comprise data values from one of said time sequences, and each of said types of data values originate from one of said sensors, wherein the step of computing an energy value for each column further comprises the step of computing a first correlation value by measuring the difference in distance between two lines defined by the sensor position and the azimuth and elevation data value at the point of closest approach of the two lines for the same time sequence from different sensors, and said step of computing a second correlation value computes a second correlation value which is proportional to the difference in velocity of said object in successive time sequences of data from a single sensor.

18. The method of claim 15 further comprising the step of transmitting a mobility value to each memory cell and comparing the mobility value of said memory cells with a predetermined threshold and replacing only memory cells having mobility values which exceed a predetermined threshold.

19. The method of claim 18 wherein said step of comparing the mobility further comprises a step of multiplying the predetermined threshold by a randomly varying number each time it makes said comparison.

20. A method of claim 18 further comprising the step of lowering the mobility value of the memory cell receiving the transferred data, and raising the mobility value of the memory cell from which the transferred data value came.

21. The method of claim 20 further comprising the step of lowering the mobility value of selected memory cells in the same column as said memory cell receiving the transferred data, said selected memory cells comprising those cells having the same class, or the same type, as the cell receiving the transferred data.

22. The method of claim 20 further comprising the step of lowering the mobility value an amount that is proportional to a computation based on surrounding data values.

23. The method of claim 22 further comprising the step of calculating a centroid of said data values in a given class to determine the amount to lower mobility.

24. The method of claim 18 further comprising the step of checking for a minimum energy state by determining the rate of change of said summed energy, and the step of resetting all mobility values to higher values if the rate of change of said energy is below a predetermined energy change threshold.

25. The method of claim 15 further comprising the step of determining the second derivative of said summed energy and determining when said second derivative is less than a second predetermined energy change threshold, wherein convergence is detected by minimal changes in said summed energy.

26. The method of claim 15 wherein said data values each comprise two dimensional data values.

* * * * *